Dec. 5, 1933.  I. M. MONDLOCH  1,937,833
WHEEL AND RIM HOLDER FOR AUTOMOBILES
Filed April 26, 1932  2 Sheets-Sheet 1
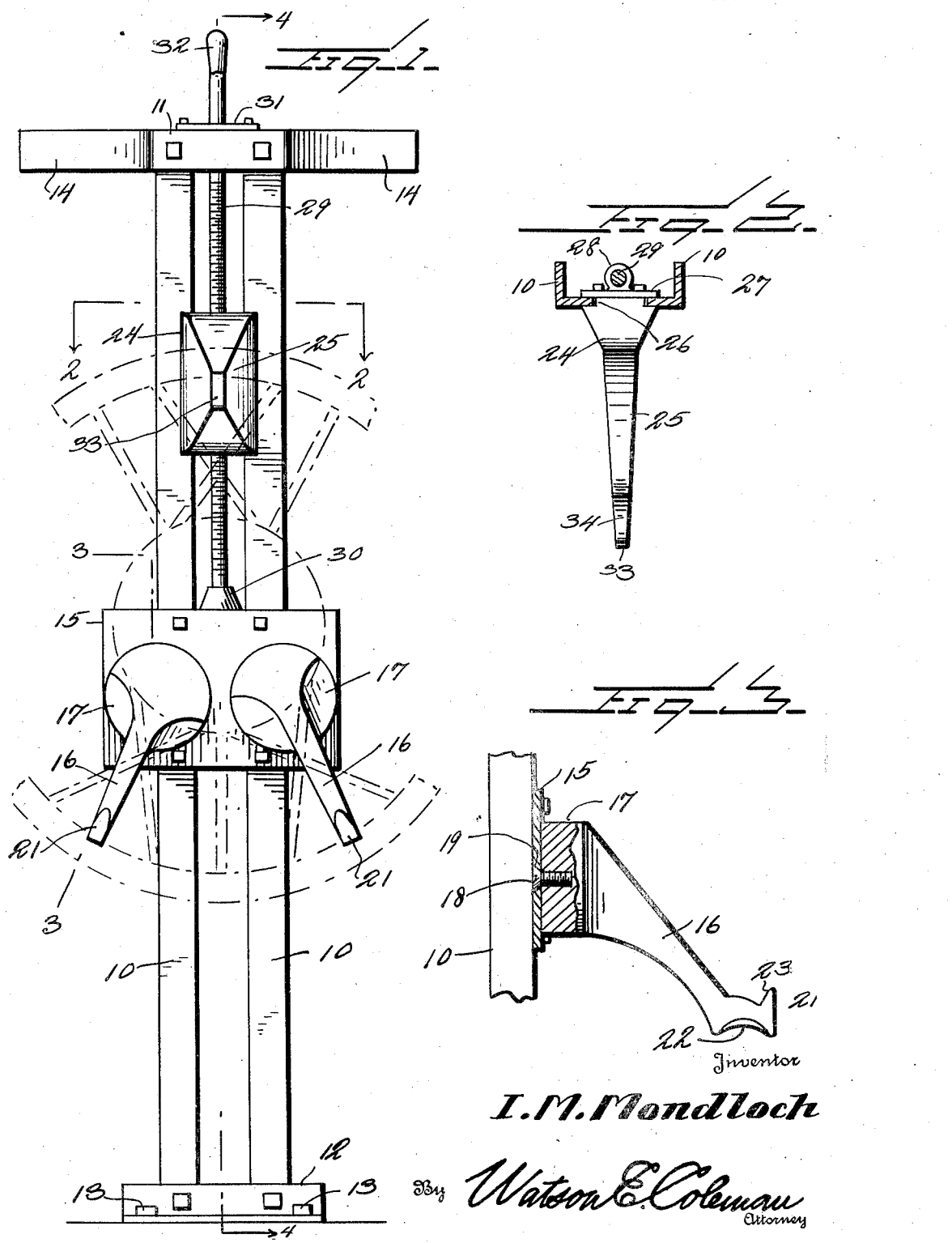
Inventor
I. M. Mondloch
By Watson E. Coleman
Attorney

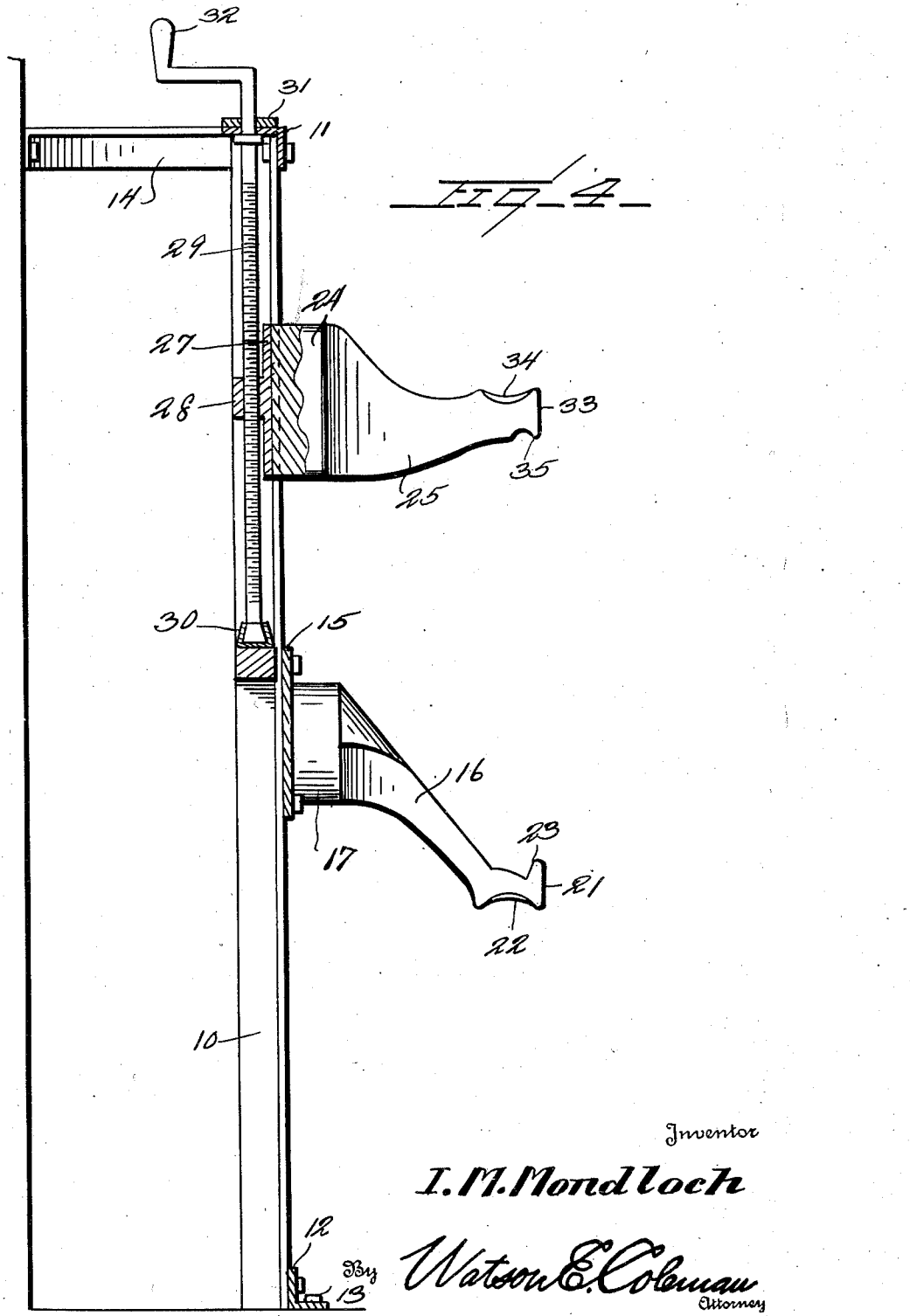

Patented Dec. 5, 1933

1,937,833

UNITED STATES PATENT OFFICE 1,937,833

WHEEL AND RIM HOLDER FOR AUTOMOBILES

Isidore M. Mondloch, Henry, S. Dak.

Application April 26, 1932. Serial No. 607,610

5 Claims. (Cl. 157—1)

This invention relates to devices for holding wheels or rims of automobiles while the rims are being broken at the split of the rim to remove or replace a tire or for holding wheels while they are being operated on.

The general object of the invention is to provide a holder of this character which may be used either in a horizontal or a vertical position and which is intended to be permanently attached in either of these positions and which is provided with wheel or rim clamps, two of the clamps being set upon the frame of the machine against longitudinal movement along the frame, the other clamp being movable toward or from the first named clamps for the purpose of gripping a wheel or rim between them.

One of the more specific objects of the invention is to provide a structure of this character in which the two lower clamps or rests for the wheel or rim are each adjustable around an axis so that the arms supporting the clamps may be swung to one side or the other to permit them to pass through between differently spaced spokes of different types of wheels.

A further object is to provide a device of this character which is very simple, strong, compact and convenient.

My invention is illustrated in the accompanying drawings, wherein:—

Figure 1 is a front elevation of a wheel and rim holder constructed in accordance with my invention;

Figure 2 is a detailed section on the line 2—2 of Figure 1;

Figure 3 is a detailed section on the line 3—3 of Figure 1;

Figure 4 is a longitudinal sectional view on the line 4—4 of Figure 1.

Referring to the drawings, and assuming that the structure is to be disposed in a vertical plane, 10 designates a pair of angle irons extending upward parallel to each other and connected at their upper ends by a transverse angle iron 11 and at their lower ends by an angle iron 12, these angle irons 11 and 12 being bolted to the irons 10. The angle iron 12 is engaged with the floor as by screws 13. Extending rearward from the ends of the angle iron, cross bar 11 are the two angle iron supports 14 which may extend rearward to any desired extent and may be connected as by flanges at their rear ends to a wall. Thus the frame of the machine consisting of the angle irons 10, 11 and 12 is firmly supported in an upright position.

Riveted, bolted or otherwise attached to the angle irons 10 slightly below the middle of these angle irons is a plate 15 upon which are mounted two swinging arms 16. These arms preferably have circular bases 17 and are held in engagement with the plate 15 each by a central screw 18. The head of this bolt is disposed in a counter-sunk recess 19 on the inner face of the plate 15 and the base is held in position by this screw. Any other suitable means for this purpose may be used, however. Each of these arms 16 extends downward and outward and at its end is formed with an outwardly projecting terminal portion 21 formed upon its inner face with a transversely concave seat lined with a pad 22 of rubber of any material which will prevent chaffing against the felloe of a wheel. This terminal portion 21 is also provided with the upwardly projecting lug 23.

Mounted between the angle irons 10 and above the plate 15 is a slide designated generally 24 comprising an arm 25, the inner end of the arm being reduced in width at 26 to pass between the angle irons. Bolted or otherwise attached to the inner face of this arm is a plate 27 which overlaps the inwardly projecting flanges of the angle irons 10 as shown most clearly in Figure 2. Mounted upon this plate is a screw-threaded sleeve 28. Extending longitudinally between the angle irons is an adjusting screw 29 which passes through the threaded sleeve 28 and at its lower end is rotatably mounted in a socket 30 carried by the plate 15 which is flanged at its upper end for this purpose. This socket prevents any vertical movement of the screw 29. The upper end of the screw 29 is also carried in a bearing plate 31 attached to the angle iron 11. The screw 29 extends above this plate 31 and is provided with the crank handle 32 whereby the screw may be operated.

The arm 25 is formed with the terminal portion 33 corresponding to the terminal portion 21 on the arm 16 and this is formed upon its upper face with a transversely concave seat having thereon the lining 34 of rubber or other suitable material which will not chafe the felloe or spokes of a wheel. The terminal 33 is also provided with the downwardly projecting lug 35 corresponding to the lug 33.

It will be seen that with this construction, the arms 16 may be swung each throughout the arc of a circle and then held in their adjusted position, if necessary, by the bolt 18. In the use of this device on a wheel, the arms 16 are swung so that the terminal portions 21 may be inserted between the spokes of the wheel and the pads 22 be disposed against the felloe of the wheel. The felloe of the wheel is also supported upon the pad 34 of arm 35. After the wheel has been placed upon these arms 16 and 25, the screw 29 is turned to shift the slide 24 away from the plate 15, thus clamping the wheel in place so that it may be treated in any desired manner or the tire and rim removed or replaced or a tire operated on or anything of this nature. This device is so constructed as to permit tires to be removed or other operations carried out from drop center wheels as well as from wheels of all other types.

The structure is also adapted to be used for the purpose of contracting split rims against the resiliency of the rim so as to make it easy to remove or replace tires. When so used, the lugs 23 and 35 catch the outer flange of the split rim and then by operating the screw 29, the rim may be contracted so as to make it easy to remove the tire or replace a tire.

After the tire is in place upon the rim, the rim may be expanded by operating the screw 29 in an obvious manner. It will be seen that the clamping member 16 and the clamping member 25 act like the jaws of a vise, this vise engaging a split rim on the outside of the rim and engaging a wheel on the inside of the felloe.

While I have heretofore described this structure as being disposed in a vertical position, I do not wish to be limited thereto as obviously the bars 10 might be disposed horizontally, the flange 12 engaged against a wall and the members 14 constitute legs resting upon the floor. Neither do I wish to be limited to the exact details of construction as these might be varied in many ways without departing from the spirit of the invention as defined in the appended claims.

I claim:—

1. A holder for tires or rims of the character described, comprising a frame including a pair of parallel angle irons and braces holding these angle irons in spaced relation, a plate attached to the angle irons, a pair of arms each bolted to the plate, one on each side of the middle of the plate, the clamping arms being rotatably adjustable in the plane of the plate, a slide carried between the angle irons and having an outstanding arm, a screw mounted at its lower end upon said plate and extending upward between the angle irons and having threaded engagement with the slide whereby the slide may be moved toward or from the plate, said arms at their ends having inwardly projecting lugs confronting each other, those faces of the arms turned away from each other having pads adapted to engage with the felloe on the inside of a wheel.

2. A holder for tires or rims including a frame having two parallel angle irons, cross bars connected to the angle irons at their opposite ends, a plate attached to the angle irons intermediate its ends, two arms disposed upon said plate, each of said arms having a central bolt engaging the plate whereby the arms may be each swung in the arc of a circle, each of said arms having an upwardly extending lug at its terminal end and a downwardly facing padded seat at its terminal end, a slide mounted upon said angle irons above the plate and carrying an outwardly projecting arm, the lower face of this arm having a depending lug, the upper face of this arm having a padded felloe seat, a screw-threaded sleeve carried by the slide, a screw having its lower end mounted in a bearing on the plate and extending upward through said sleeve and through the transverse brace at the top of the angle irons and having a crank whereby it may be rotated to thus adjust the slide toward or from the plate.

3. A wheel and supporting structure of the character described, comprising a pair of parallel angle irons, a brace connected to one end of the angle irons and having an attaching flange, a brace extending transversely across the upper ends of the angle irons and attached thereto, supports attached to the ends of the last named brace and extending at right angles thereto, a plate attached to the angle irons, a pair of arms each pivotally mounted upon said plate for swinging movement toward or from each other, a slide mounted upon the angle irons, a screw having threaded engagement with the slide, the screw at its lower end being operatively supported upon the plate and at its upper end extending through said second named brace and having a crank handle, the slide carrying an outstanding arm, the arms on the plate extending outward and away from the arm on the slide, the arm on the slide having a terminal portion provided on its face confronting the first named arms with a lug and upon its opposite face with a transversely curved pad, each of the arms on the plate having a terminal portion formed with a lug confronting the arm on the slide and upon its opposite face with a transversely curved padded seat.

4. A rack for a wheel having a drop center rim, said rack comprising a T-shaped frame, a hook secured to each extremity of the cross head of the T, the stem of the T being formed with ways, a nut having sliding engagement with said ways, a hook carried by the nut, a feed screw threading the nut, a bearing for the feed screw fixed to the free end of the stem, means for holding the screw against endwise movement in said bearing, a crank handle on the outer end of the feed screw, said bearing having a bracket extension, means for securing the cross-head and the bracket extension to a support, the depth of the cross head and extension being such as to space the screw sufficiently from the support to provide a clearance of the crank handle, said hooks facing inwardly and adapted to engage and grip the outer periphery of said rim.

5. A rack for a wheel having a drop center rim with a bead at each margin of the rim, said rack comprising a top frame member, a bottom frame member, a pair of rails connecting said members, a nut slidable between and in engagement with said rails, a feed screw journaled in the top frame member and threading the nut, means for holding the feed screw against endwise movement, means for turning the feed screw, a hook carried by the nut, a pair of hooks secured to the bottom frame member in mutually spaced relation, the three hooks facing inwardly and being adapted to engage and grip the outer periphery of one of the beads of said rim, and means for securing the top and bottom frame members to a suitable support.

ISIDORE M. MONDLOCH.